(12) United States Patent
Fan et al.

(10) Patent No.: US 12,166,218 B2
(45) Date of Patent: Dec. 10, 2024

(54) FLEXIBLE BATTERY AND PREPARATION METHOD THEREOF

(71) Applicant: HUAWEI TECHNOLOGIES CO., LTD., Guangdong (CN)

(72) Inventors: Liang Fan, Shenzhen (CN); Wei Zhou, Shenzhen (CN); Yangxing Li, Shenzhen (CN); Pinghua Wang, Shenzhen (CN); Yong Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 16/717,111

(22) Filed: Dec. 17, 2019

(65) Prior Publication Data

US 2020/0127245 A1    Apr. 23, 2020

Related U.S. Application Data

(63) Continuation of application No. PCT/CN2018/091173, filed on Jun. 14, 2018.

(30) Foreign Application Priority Data

Jun. 17, 2017 (CN) .......................... 201710459776.3

(51) Int. Cl.
*H01M 50/136* (2021.01)
*H01M 50/105* (2021.01)
(Continued)

(52) U.S. Cl.
CPC ....... *H01M 50/136* (2021.01); *H01M 50/105* (2021.01); *H01M 50/117* (2021.01);
(Continued)

(58) Field of Classification Search
CPC ............. H01M 50/116; H01M 50/136; H01M 50/105; H01M 50/184; H01M 2220/30
See application file for complete search history.

(56) References Cited

U.S. PATENT DOCUMENTS

2013/0101884 A1   4/2013   Ueda
2013/0171490 A1   7/2013   Rothkopf et al.
(Continued)

FOREIGN PATENT DOCUMENTS

CN    102959760 A    3/2013
CN    103682410 A    3/2014
(Continued)

OTHER PUBLICATIONS

EPO machine generated English translation of CN-106252737-A (Year: 2016).*

(Continued)

*Primary Examiner* — Christopher P Domone
*Assistant Examiner* — Kimberly Wyluda
(74) *Attorney, Agent, or Firm* — Fish & Richardson P.C.

(57) ABSTRACT

One example of a flexible battery includes an electrochemical cell layer and a wrapping layer that wraps the electrochemical cell layer. The flexible battery further includes an energy absorbing layer. The energy absorbing layer is located between the wrapping layer and upper and lower surfaces, which are opposite to each other, of the electrochemical cell layer. The energy absorbing layer includes a plurality of supporting parts that protrude outward from the upper or lower surface of the electrochemical cell layer. The plurality of supporting parts are mainly made of a foam material or rubber. For the energy absorbing layer, a lower-modulus buffering layer or an empty part may be further disposed between the electrochemical cell layer and the wrapping layer, to complement a wavy surface of the supporting part to form a flat surface, so as to meet diversified requirements of a wearable device.

10 Claims, 3 Drawing Sheets

(51) Int. Cl.
*H01M 50/117* (2021.01)
*H01M 50/119* (2021.01)
*H01M 50/121* (2021.01)
*H01M 50/129* (2021.01)
*H01M 50/14* (2021.01)
*H01M 50/178* (2021.01)
*H01M 50/184* (2021.01)
*H01M 50/557* (2021.01)

(52) U.S. Cl.
CPC ....... *H01M 50/119* (2021.01); *H01M 50/121* (2021.01); *H01M 50/129* (2021.01); *H01M 50/14* (2021.01); *H01M 50/178* (2021.01); *H01M 50/557* (2021.01); *H01M 50/184* (2021.01); *H01M 2220/30* (2013.01)

(56) References Cited

U.S. PATENT DOCUMENTS

| | | | |
|---|---|---|---|
| 2015/0179989 | A1 | 6/2015 | Luo et al. |
| 2016/0013459 | A1 | 1/2016 | Suh et al. |
| 2016/0248053 | A1 | 8/2016 | Iseri et al. |
| 2016/0322611 | A1 | 11/2016 | Kang et al. |
| 2017/0040582 | A1 | 2/2017 | Kim |
| 2017/0329368 | A1 | 11/2017 | Rho et al. |
| 2018/0269436 | A1* | 9/2018 | Lee .................... H01M 50/124 |

FOREIGN PATENT DOCUMENTS

| | | | | |
|---|---|---|---|---|
| CN | 105261779 | A | 1/2016 | |
| CN | 105304929 | A | 2/2016 | |
| CN | 103959480 | B | 6/2016 | |
| CN | 105874640 | A | 8/2016 | |
| CN | 105914305 | A | 8/2016 | |
| CN | 205588701 | U | 9/2016 | |
| CN | 106058308 | A | 10/2016 | |
| CN | 106207540 | A | 12/2016 | |
| CN | 106252737 | A | 12/2016 | |
| CN | 106354216 | A | 1/2017 | |
| CN | 103824985 | B | 2/2017 | |
| CN | 106449819 | A | 2/2017 | |
| CN | 106450124 | A | 2/2017 | |
| CN | 106450479 | A | 2/2017 | |
| CN | 206162280 | U | 5/2017 | |
| CN | 107452982 | A | 12/2017 | |
| CN | 207250575 | U | 4/2018 | |
| EP | 2884560 | A1 | 6/2015 | |
| EP | 3057153 | A1 | 8/2016 | |
| JP | 2000173559 | A | | 6/2000 |
| JP | 2002208385 | A | * 7/2002 | |
| KR | 2004-0054201 | A | * 6/2004 | ........ H01M 10/0413 |
| KR | 2016-0090106 | A | * 7/2016 | .......... H01M 10/045 |
| KR | 20160107022 | A | 9/2016 | |
| KR | 20160121281 | A | * 10/2016 | |
| WO | 2016064240 | A1 | 4/2016 | |

OTHER PUBLICATIONS

EPO machine generated English translation of Jp 2000-173559-A (Year: 2000).*
EPO machine generated English translation of KR-2016-0121281-A (Year: 2016).*
EPO machine generated English translation of JP-2002-208385-A (Year: 2002).*
EPO machine generated English translation of KR 2004-0054201 A (Year: 2004).*
EPO machine generated English translation of KR-2016-0090106-A (Year: 2016).*
Extended European Search Report issued in European Application No. 18816688.8 on Apr. 29, 2020, 7 pages.
PCT International Search Report and Written Opinion in International Application No. PCT/CN2018/091, 173, dated Aug. 21, 2018, 20 pages (With English Translation).
Search Report issued in Chinese Application No. 201710459776.3 on Apr. 20, 2018, 8 pages.

* cited by examiner

A

B

C

D

FLEXIBLE BATTERY AND PREPARATION METHOD THEREOF

CROSS-REFERENCE TO RELATED APPLICATIONS

This application is a continuation of International Application No. PCT/CN2018/091173, filed on Jun. 14, 2018, which claims priority to Chinese Patent Application No. 201710459776.3, filed on Jun. 17, 2017. The disclosures of the aforementioned applications are hereby incorporated by reference in their entireties.

TECHNICAL FIELD

The present invention relates to the field of flexible energy storage devices, and in particular, to a flexible lithium battery and a method for preparing the flexible lithium battery.

BACKGROUND

With mankind's yearning for a better life in the future, intelligent wearable devices are favored by people for their characteristics of high technology and portability. High intelligence, miniaturization, and portability are an important development direction of future wearable electronic devices. As mankind imposes more requirements on functions of a wearable device, a size of a screen is increasingly large and power consumption of the wearable device is increasingly high. Therefore, a battery life requirement on a battery of the wearable device is increasingly high, and this imposes strict requirements on high energy density of a rechargeable lithium-ion battery. In addition, a wearable device imposes high requirements on flexible bending performance of components. Generally, the device needs to be capable of being bent or folded, or being comfortably worn on different parts of a human body, to attain a smaller volume, facilitate portability, and bring better consumer experience.

For a wearable device, a requirement for a high volumetric energy density and good bending performance is imposed on its battery. Based on this demand, a flexible lithium battery is bendable and easy to be worn; and therefore can greatly save a battery holder dedicated for the wearable device, and becomes a hot issue during development of power supplies of wearable devices in today's world. The flexible lithium battery can find its commercial application in advanced next-generation electronic products, such as a smartwatch (band), AR or VR glasses, a flexible tablet, a mobile phone, and a healthcare product.

A core technology of the flexible lithium battery is: obtaining good flexibility on a basis of maintaining electrochemical performance of a conventional lithium battery. Therefore, good flexibility is a key technical issue to be resolved by the flexible battery. Currently, technical solutions for implementing flexibility emerge one after another, but all of them have many disadvantages.

However, currently a flexible lithium-ion battery has common problems: a low energy density, poor flexibility, and poor comfort experience. A major reason is that a flexible auxiliary material is added to the battery, or a structure of the battery is greatly adjusted, to enable the battery to be flexible. This reduces a volumetric energy density of the flexible battery, and increases structural complexity. In addition, obtained flexibility is very limited, and excessive bending of the battery may still easily occur, causing performance degradation earlier than expected.

Splicing of a flexible circuit board for a small-sized lithium-ion battery is a manner of implementing battery flexibility, but such a splicing manner imposes high requirements on reliability of electrical connection and mechanical connection of the battery. During battery charging and discharging, a plurality of small-sized batteries need to be managed and controlled. This imposes relatively high requirements on circuit control, and increases difficulty in circuit control. When a plurality of batteries are repeatedly bent and deform, it is often difficult to ensure reliability of electric contact, and problems of low reliability and very poor comfort also exist for a mechanical connection part of an entire battery pack during wearing.

A thin-film lithium battery is another way of implementing flexibility of a lithium battery. However, a thickness of a thin-film lithium battery is usually not more than 0.5 mm. If the battery is too thick, bending performance of the battery severely decreases. To maintain air-tightness and bending performance of a battery, usually a thickness of a packaging material used for the battery reaches 0.2 mm, accounting for a relatively large volume proportion. This directly causes a relatively low volumetric energy density (<100 Wh/L), making it difficult to meet battery life requirements of most wearable devices.

SUMMARY

In view of this, according to a first aspect, an embodiment of the present invention provides a flexible lithium battery, to ensure that the battery has sufficient energy density to meet battery life requirements of most wearable devices while avoiding reduction in reliability of electric contact caused by excessive bending of the battery during repeated bending and deformation.

According to the first aspect, an embodiment of the present invention provides a flexible battery, including an electrochemical cell layer and a wrapping layer that wraps the electrochemical cell layer, where the flexible battery further includes an energy absorbing layer; the electrochemical cell layer has a first surface and a second surface that are opposite to each other; the energy absorbing layer is located between the first surface of the electrochemical cell layer and the wrapping layer and between the second surface of the electrochemical cell layer and the wrapping layer; the energy absorbing layer includes a plurality of supporting parts; each supporting part in the plurality of supporting parts protrudes outward from an upper or lower surface of the electrochemical cell layer; the plurality of supporting parts are mainly made of an elastic material; each supporting part is a bugle from a highest point to lowest points on two sides closest to the electrochemical cell layer; and the elastic material may be an elastic material having characteristics such as a low modulus of elasticity, a high elastic limit, and a long fatigue life.

In the foregoing embodiment of the present invention, a layer of low-elasticity materials is added inside the flexible battery to disperse and absorb stress generated when the battery is bent and deforms, to avoid partial excessive bending of the battery and enable the battery to always maintain an arc for transition during bending, thereby playing functions of absorbing and dispersing the deformation stress and achieving an objective of protecting an electrochemical cell.

With reference to the first aspect, in a first possible implementation of the first aspect, the energy absorbing layer includes a first-surface supporting part and a second-surface supporting part; the first-surface supporting part comprises a plurality of supporting parts located between the first surface of the electrochemical cell layer and the wrapping layer; the second-surface supporting part includes a plurality of supporting parts located between the second surface of the electrochemical cell layer and the wrapping layer; and a bulge of the first-surface supporting part protruding outward from the electrochemical cell layer is interlaced with a bulge of the second-surface supporting part protruding outward from the electrochemical cell layer, to facilitate bending of the flexible battery from either surface and avoid excessive bending. In other words, there is a position offset between energy absorbing structures on the first surface and the second surface that are opposite to each other. Usually, the position offset may be that a bulge on the first surface corresponds to a dent on the second surface.

In the energy absorbing layer, interlacing of a bulge in an upper layer and a bulge in a lower layer means that an upper-layer bulge corresponds to a lower-layer non-bulge position. In this way, during bending from top to bottom, the lower layer is just located at the non-bulge positions, facilitating the bending. When the bending reaches a particular degree, a bulge in the upper layer corresponds to a bent position, to play a function of absorbing bending energy, so that further bending is limited.

With reference to the first aspect or the first possible implementation of the first aspect, in a second possible implementation of the first aspect, the energy absorbing layer further includes a plurality of filling parts between the plurality of supporting parts and the wrapping layer, the plurality of filling parts and the plurality of supporting parts are interlaced with each other, the filling part is mainly made of an elastic material, and a modulus of elasticity of the filling part is smaller than a modulus of elasticity of the supporting part. In another possible implementation, the filling part is an empty part not filled with any elastic material, but some compressed gas may be filled to play different cushion functions.

Adding of the filling part or the empty part brings a better energy absorbing effect and a better effect of protecting the electrochemical cell, and also enables the flexible battery to have a flat surface, to meet different requirements of wearable devices.

With reference to the first aspect or the first or second possible implementation of the first aspect, in a third possible implementation of the first aspect, on a cross section vertical to the two opposite surfaces of the electrochemical cell layer, the supporting part is in a shape of any one of a semicircle, a semiellipse, an isosceles trapezoid, an isosceles triangle, and a hollow square; the elastic material includes a foam material or rubber; the foam material includes a foamed polymer material or an inorganic foam material; and the cushion part may be in a shape complementary to the supporting part, that is, the cushion part and the supporting part together fill space between the wrapping layer and the electrochemical cell layer.

The foregoing materials and filling shapes are merely some examples in this embodiment of the present invention, and enumeration is impossible actually. Any shape suitable for energy absorption and any material having characteristics, such as a low modulus of elasticity, a high elastic limit, and a long fatigue life, can be used as a design shape of the supporting part and a material for making the supporting part, to play functions of protecting the electrochemical cell and preventing excessive bending.

With reference to the first aspect or the first or second or third possible implementation of the first aspect, in a fourth possible implementation of the first aspect, on the cross section vertical to the two opposite surfaces of the electrochemical cell layer, the supporting part is in a shape of any one of a semicircle, a semiellipse, an isosceles trapezoid, an isosceles triangle, and a hollow square. Alternatively, a shape of the cushion part may be the same as that of the supporting part. It may be understood that, this embodiment of the present invention is not limited to the listed shapes, and any other structural shape suitable for energy absorption design may be used as appropriate extension of the present invention and fall within an innovative idea of the present invention.

With reference to the first aspect or the first or second or third or fourth possible implementation of the first aspect, in a fifth possible implementation of the first aspect, the flexible battery further includes a protection layer disposed on an outer surface of the wrapping layer, where the protection layer is mainly made of an elastic material, to form double-layer protection for the electrochemical cell layer; and the elastic material forming the protection layer includes a rubber, silica gel, or fiber material, and the protection layer is configured to fill the outer surface of the wrapping layer.

On a basis of the energy absorbing layer, the protection layer can further protect the electrochemical cell layer. In addition, the wrapping layer is covered with silica gel. This also improves user experience such as improving appearance and a sense of touch.

According to a second aspect, an embodiment of the present invention provides a wearable device, including a device body and a wearable-device accessory, where the wearable-device accessory is configured to fasten the device body on a part of a human body, and the flexible battery according to the first aspect and the implementations of the first aspect is disposed inside the wearable-device accessory, to supply power to the device body. The wearable device mainly includes a portable electronic device worn on a specific part of a human body, such as a smartwatch, smart glasses, or a VR device. Because of outstanding portability of the flexible terminal device, a flexible terminal device equipped with a flexible screen is also included in the wearable device in this embodiment of the present invention. In other words, the flexible battery in this embodiment of the present invention is applicable to a flexible terminal device.

The foregoing flexible battery may be used as a part of a wearable device, such as a watch strap of a smartwatch, or may be built into a watch strap of a smartwatch; or may be used as a fastening band of a VR device, or may be built into the fastening band. In this way, the flexible battery does not need to occupy any space of a main part of the wearable device, can be used as a battery to supply electric power to the wearable device.

DESCRIPTION OF EMBODIMENTS

Figure 1:
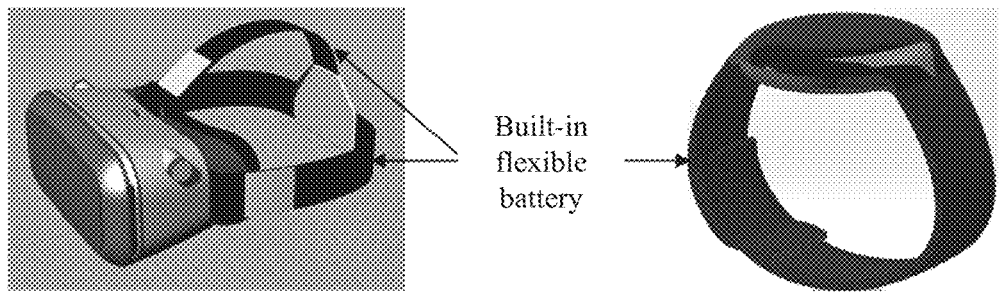
FIG. 1 is a three-dimensional view of a related wearable device according to the present invention.

The following descriptions are example implementations of the present invention. It should be noted that, a person of ordinary skill in the art may make certain improvements and polishing without departing from the principle of the present invention, and the improvements and polishing shall also be considered as falling within the protection scope of embodiments of the present invention.

A major objective of the embodiments of the present invention is to find, for a flexible lithium-ion battery, a desired solution that considers both flexibility and a volumetric energy density of a lithium battery. For example, a layer of mechanical parts with desired flexibility may be added to a structure of a lithium battery, to protect the battery, so that stress generated during bending of the battery may be repeatedly absorbed and dispersed through elastic deformation of this layer of materials, to avoid excessive bending that occurs during bending of a conventional lithium battery, thereby achieving objectives of flexibility and a long bending fatigue life. The mechanical part with desired flexibility may be located outside the lithium battery, or may be located between an electrochemical cell and a packaging material, or may be scattered between a positive electrode and a negative electrode of an electrochemical cell of the lithium battery.

Therefore, a material, of which the mechanical part with desired flexibility is made, should first be a component whose modulus of elasticity is the smallest, without increasing difficulty in deformation of the battery, in the battery structure, and can deform earlier than all other components of the battery, to well absorb and disperse energy. In addition, a smaller modulus of elasticity of the material brings a more obvious effect. In addition, the material, of which the structure with desired flexibility is made, should have a relatively high elastic deformation limit, to ensure that the material does not malfunction or does not generate irrecoverable deformation when the battery greatly deforms. Furthermore, the material, of which the structure with desired flexibility is made, should be capable of repeated deformation and should have a relatively long fatigue life. At last, when getting in contact with electrolyte, the material should have desired chemical stability, so that the material does not have any chemical reaction with the electrolyte. In this way, the flexible battery can adapt to an urgent requirement, of a future wearable device, for a high volumetric energy density, high flexibility, and a long bending life of a flexible battery with which the wearable device is equipped.

In some application scenarios in the embodiments of the present invention, a wearable device, such as a smartwatch (or bracelet), AR (or VR) glasses, or a headset, mainly includes a chip, a display, a battery, a mechanical shell, a wearable fastener that can repeatedly bend, and the like. The battery of the wearable device is usually integrated in the mechanical shell, causing an obvious increase in a volume of the wearable device and reducing an advantage of the wearable device in terms of portability. A flexible battery shown in FIG. 1 may be placed inside a wearing fixture, to provide a wearable device with a large-capacity power supply and reduce a volume of a mechanical part that accommodates a chip, thereby bringing better portability to mankind and helping to implement a function of a wearable structure on a human body. The flexible battery belongs to a battery technology integrating both structures and functions. All of such wearable devices having a wearable fastener are ideal objects to which the flexible battery is applicable.

In addition, a product fueled by revolution of a flexible display, such as a flexible mobile phone or a flexible tablet computer, also requires that a battery component with which the product is equipped should be able to bend and deform along with a screen, and that an entire electronic device should be able to worn on a part, such as a wrist of a human body when necessary. Flexible batteries may be arranged behind displays of these devices, to cooperatively bend and deform along with the display. Therefore, the flexible battery is expected to show its unique advantages in the flexible display field and has a promising prospect in market application.

Figure 2:
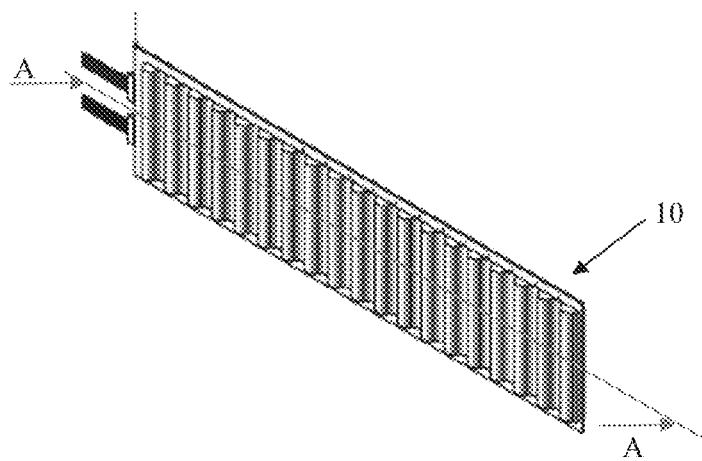
FIG. 2 is a three-dimensional view of a flexible battery according to an embodiment of the present invention.
Figure 3:
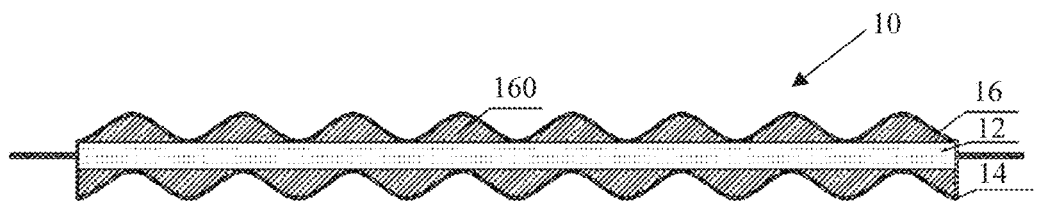
FIG. 3 is a sectional view of a flexible battery along an A-A cross-section line in FIG. 2.

As shown in FIG. 2 and FIG. 3, which is a sectional view along an A-A line shown in FIG. 2, an embodiment of the present invention provides a flexible battery 10, including an electrochemical cell layer 12, a wrapping layer 14 that wraps the electrochemical cell layer 12, and an energy absorbing layer 16 located between the electrochemical cell layer 12 and the wrapping layer 14. The energy absorbing layer 16 is located between an upper surface of the electrochemical cell layer 12 and the wrapping layer 14 and between a lower surface of the electrochemical cell layer 12 and the wrapping layer 14. The energy absorbing layer 16 includes a plurality of supporting parts 160 that protrude outward from the upper or lower surface of the electrochemical cell layer 12. The plurality of supporting parts 160 are made of an elastic material, such as a foam material or rubber. For ease of subsequent description, the opposite upper and lower surfaces of the electrochemical cell layer 12 may be defined as a first surface and a second surface respectively, namely, two opposite surfaces, with largest areas, of the energy absorbing layer 16. The remaining surfaces of the electrochemical cell layer 12 are side surfaces in a thickness direction.

Each supporting part 160 in the plurality of supporting parts 160 is a bulge protruding outward from the upper or lower surface of the electrochemical cell layer 12. A bulge from a highest point of the bulge to two lowest points on two sides closest to the electrochemical cell layer form one supporting part 160. Although an energy absorbing structure in the energy absorbing layer 16 is referred to as the plurality of supporting parts 160, actually the plurality of supporting parts 160 may be formed by integrated molding, or may be considered as one component having a plurality of bulges. It may be understood that, due to current cognitive constraints on materials, an elastic material, such as a foam material or rubber, is mainly selected for the plurality of supporting parts 160 in this embodiment of the present invention, but this should not be construed as any limitation on the present invention; and any elastic material having characteristics, such as a low modulus of elasticity (where the modulus of elasticity is about 0.1 MPa), a high elastic limit, and a long fatigue life, may be used as a material for making the plurality of supporting parts.

In this embodiment, the energy absorbing layer 16 includes a first-surface supporting part and a second-surface supporting part, the first-surface supporting part comprises a plurality of supporting parts 160 located between the first surface of the electrochemical cell layer 12 and the wrapping layer 14, and the second-surface supporting part includes a plurality of supporting parts 160 located between the second surface of the electrochemical cell layer 12 and the wrapping layer 14. The wrapping layer 14 clings to a surface of the supporting part 160, to form wavy curved surfaces that are the same as the surface of the supporting part 160. A bulge of the first-surface supporting part protruding outward from the electrochemical cell layer is interlaced with a bulge of the second-surface supporting part protruding outward from the electrochemical cell layer 12, to facilitate bending of the flexible battery 10 from either surface and avoid excessive bending that would otherwise cause damages to the electrochemical cell layer 12. For example, the plurality of supporting parts 160 located between one surface of the electrochemical cell layer 12 and the wrapping layer 14 are interlaced, along a direction parallel to the two opposite surfaces of the electrochemical cell layer 12 by a deviation that is half a width of the supporting part 160, with the plurality of supporting parts 160 on the other surface of the electrochemical cell layer 12, to form upper-and-lower interlaced arrangement.

The upper-and-lower interlaced arrangement includes: A center of any supporting part 160 in the plurality of supporting parts 160 located between the first surface of the electrochemical cell layer 12 and the wrapping layer 14 exactly faces, along a direction vertical to the two opposite surfaces of the electrochemical cell layer 12, a middle position of two supporting parts 160 in the plurality of supporting parts 160 located on the second surface of the electrochemical cell layer 12 and the wrapping layer 14. In other words, a highest point, protruding outward from the electrochemical cell layer 12, of any supporting part 160 in the first-surface supporting parts exactly faces, along the direction vertical to the two opposite surfaces of the electrothemical cell layer 12, a joint between two neighboring supporting parts 160 in the second-surface supporting parts, to implement upper-and-lower interlaced arrangement of the supporting parts 160. The highest point is a highest position of one supporting part 160 protruding outward from the electrochemical cell layer 12. The joint between two neighboring supporting parts 160 in the plurality of supporting parts 160 is a part, closest to the electrochemical cell layer 12, of a surface of the supporting parts 160.

In this embodiment, the wavy curved surface formed when the wrapping layer 14 clings to the surface of the supporting part 160 is in a shape of a sine or cosine waveform, a wave crest of the curved surface located on one surface of the electrochemical cell layer 12 exactly faces, along the direction vertical to the two opposite surfaces of the electrochemical cell layer 12, a wave trough of the curved surface located on the other surface of the electrochemical cell layer 12, to implement upper-and-lower interlaced arrangement supporting a cross section in a shape of a sine or cosine waveform. A wavelength of the sine or cosine waveform may be about 5 mm, and an amplitude of the sine or cosine waveform may be 0.4 mm. A major reason for the upper-and-lower interlaced arrangement is to prevent the flexible battery from excessive bending that would otherwise cause damages to the flexible battery. For example, a specific supporting part 160 in the plurality of supporting parts 160 exactly faces a bending position when the flexible battery is bent from either the upper surface or the lower surface, to prevent the flexible battery from being further bent when the flexible battery is bent to a particular degree.

In some embodiments, the wrapping layer 14 may be aluminum-plastic membrane. In an actual manufacturing process, first the aluminum-plastic membrane may be stamped to make a wavy surface, to form a plurality of stamped pits; then an elastic energy absorbing material may be made, by using a machining method, into two wave-shaped sheets that match upper and lower stamped pits of the aluminum-plastic membrane; and then these elastic energy absorbing materials are fixed into wave-shaped pits in the stamped pits of the aluminum-plastic membrane by using Acrylic adhesive. After the fixation, a relatively flat inner cavity is formed on an inner surface of the pit, and at the same time the energy absorbing layer 16 is formed.

Figure 4:
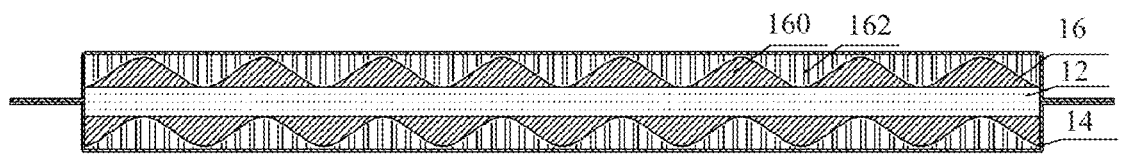
FIG. 4 is a sectional view of a flexible battery according to another embodiment of the present invention.

As shown in FIG. 4, for a flexible battery in another embodiment of the present invention, a plurality of filling parts 162 are disposed and filled between the plurality of supporting parts 160 and the wrapping layer 14. The filling part 162 is a part of the energy absorbing layer 16, and located between the electrochemical cell layer 12 and the wrapping layer 14. A shape of the filling part 162 is complementary to the supporting part 160, so that the energy absorbing layer 16 has an even thickness, and the wrapping layer 14 and the flexible battery have two opposite flat surfaces. Unlike the foregoing embodiment of the present invention in which the wrapping layer 14 clings to the filling part 162 so that the wrapping layer 14 and the flexible battery have two opposite wave-shaped surfaces, in this embodiment, the wrapping layer 14 and the flexible battery have two opposite flat surfaces, to adapt to requirements in different wearing scenarios.

Both a shape and a material of the supporting part 160 may be the same as those of the supporting part 160 in the foregoing embodiment. A modulus of elasticity of the filling part 162 is far lower than that of the supporting part 160. The filling part 162 may be made of a porous foam material or rubber whose modulus of elasticity is lower than that of the material for making the supporting part 160, or may be made of another material having a lower modulus of elasticity, such as sponge or foam cotton. In this embodiment, the plurality of supporting parts 160 may be the same as the plurality of supporting parts 160 in the foregoing embodiment in terms of materials, structures, and shapes; and have same upper-and-lower interlaced arrangement. The filling parts 162 are also in an upper-and-lower interfaced arrangement. In other words, the plurality of filling parts 162 located between one surface of the electrochemical cell layer 12 and the wrapping layer 14 are interlaced, along the direction parallel to the two opposite surfaces of the electrochemical cell layer 12 by a deviation that is half a width of the filling part 162, with the plurality of filling parts 162 located on the other surface of the electrochemical cell layer 12 and the wrapping layer 14, to form the upper-and-lower interlaced arrangement. A contact surface between the supporting parts 160 and the filling parts 162 is a wavy curved surface. The plurality of supporting parts 160 are located on a side of the curved surface closer to the electrochemical cell layer 12. The plurality of filling parts 162 are located on a side of the curved surface closer to the wrapping layer 14.

The supporting parts 160 of the energy absorbing layer 16 and the filling parts 162 of the energy absorbing layer 16 are interlaced with each other between the electrochemical cell layer 12 and the wrapping layer 14. The supporting parts 160 and the filling parts 162 are complementally disposed in the energy absorbing layer 16. In other words, the supporting parts 160 and the filling parts 162 together form the entire energy absorbing layer 16. An upper part of the energy absorbing layer 16 and a lower part of the energy absorbing layer 16 are disposed asymmetrically about the electrochemical cell layer 12. A center of any supporting part 160 located between the upper surface of the electrochemical cell layer 12 and the wrapping layer 14 exactly faces, along the direction vertical to the upper and lower surfaces of the electrochemical cell layer 12, a center of one of the filling parts 162 located between the lower surface of the electrochemical cell layer 12 and the wrapping layer 14. In other words, the upper part and the lower part of the energy absorbing layer 16 are interlaced with each other by a deviation of a width of one filling part 162 or one supporting part 160, relative to the surface of the electrochemical cell layer 12, to implement an upper-and-lower interlaced arrangement. The center of the filling part 162 includes a geometrical center of the filling part 162, or an intersection point between a central line of the filling part 162 in a length direction and a central line of the filling part 162 in a height direction. The center of the supporting part 160 includes a geometrical center of the supporting part 160, or an intersection point between a central line of the supporting part 160 in a length direction and a central line of the supporting part 160 in a height direction.

A major reason for the upper-and-lower interlaced arrangement is to prevent the flexible battery from excessive bending that would otherwise cause damages to the flexible battery. For example, a specific supporting part 160 in the plurality of supporting parts 160 exactly faces a bending position, no matter whether the flexible battery is bent from the upper surface or the lower surface, so that the flexible battery is prevented from being further bent when the flexible battery is bent to a particular degree.

In this embodiment, along a direction of the positive electrode and the negative electrode of the flexible battery 10, on a cross section that is of the flexible battery 10 and that is vertical to the upper and lower surfaces of the electrochemical cell layer 12, a cross section of the supporting part 160 and a cross section of the filling part 162 are both in a shape of half-sine or half-cosine waveform and are reversely complementary to each other. The supporting part 160 and the filling part 162 are interlaced with each other, and a contact surface between the supporting part 160 and the filling part 162 is in a shape of a waveform. A wave trough of the waveform contacts the wrapping layer 14, and a wave crest of the waveform contacts a surface of the electrochemical cell layer 12; or a wave crest of the waveform contacts the wrapping layer 14, and a wave trough of the waveform contacts a surface of the electrochemical cell layer 12. The being reversely complementary to each other means that the supporting part 160 and the filling part 162 are combined to form the energy absorbing layer 16; a connecting surface between the supporting part 160 and the filling part 162 is a sine or cosine curved surface; and the supporting part 160 is located between the curved surface and the electrochemical cell layer 12, and the filling part 162 is located in a reverse direction, that is, the filling part 162 is located between the curved surface and the wrapping layer 14.

In the foregoing embodiments, a material for making the supporting part 160 needs to have characteristics, such as a low modulus of elasticity (where the modulus of elasticity is required to be lower than 15 GPa), a high elastic limit (where the elastic deformation limit is larger than 10%), and a long fatigue life (for the fatigue life, a quantity of times the material can recover when being compressed by 10% is required to be larger than 2000). When an elastic energy absorbing material B is directly in contact with electrolyte, the elastic energy absorbing material B should further have a characteristic of not reacting with the electrolyte. Optional materials having these characteristics include materials, such as foamed polymer materials, inorganic foam materials (materials such as foam metal and foam granite), and rubber. Materials listed in the following Table I are some preferential elastic energy absorbing materials, but are not limited thereto. Any material having characteristics, such as a low modulus of elasticity, a high elastic limit, and a long fatigue life, can be used as a material for making the supporting part 160 or the filling part 162 in the energy absorbing layer 16 in this embodiment of the present invention.

TABLE 1

Property list of elastic energy absorbing materials

| | Material | Modulus elasticity (GPa) | Elastic deformation of limit (%) | Fatigue life (times) |
|---|---|---|---|---|
| Foamed polymer material | Foamed PP Foamed PE | 0.001-1 | >50 | >10000 |
| Inorganic foam material | Foam metal Foam granite | 0.1-10 0.1-5 | >30 About 20 | >10000 >3000 |
| Rubber | Styrene-butadiene rubber Perfluoro rubber | <0.5 | >100 | >5000 |

A lithium-ion battery or a lithium metal battery, or a combination of materials commonly seen on a market, such as a positive electrode and a negative electrode, a separator, and a current collector may be selected as the electrochemical cell layer 12. A battery manufactured by using a lamination technology should be preferentially selected, to improve flexibility and curvature of the battery.

The wrapping layer 14 of the flexible battery may be made of a flexible aluminum-plastic composite membrane material. For example, in the wrapping layer 14, aluminum-plastic composite membrane similar to that of a lithium-ion polymer battery is used as a shell of the battery, to substitute a steel or aluminum shell of a common lithium-ion battery. The aluminum-plastic composite membrane includes a structure of three layers: an inner layer, a middle layer, and an outer layer. The inner layer is a bonding layer, and most often, uses a polyethylene or polypropylene material to play a sealing and bonding function. The middle layer is aluminum foil, and can prevent external water vapor from getting into the battery and prevent internal electrolyte from leaking out. The outer layer is a protection layer, and most often, uses a polyester or nylon material with a high melting point and very strong mechanical performance, to avoid damages by external force to the battery and protect the battery.

According to principles of mechanics, when force acts on an object, a part with a low modulus of elasticity is the first to deform, to absorb partial energy. A modulus of elasticity of the energy absorbing layer 16 is the smallest among all components of the flexible battery, and the energy absorbing layer 16 deforms earlier than all other components, to play a relatively good energy absorbing function. As deformation goes on, a contact area between an energy absorbing material and a position on which stress is concentrated becomes larger, to further play a relatively good energy dispersion function, thereby avoiding an obvious crease that would otherwise be caused by partial small-angle bending of the battery. Among components of the flexible battery, such as the electrochemical cell layer 12 and the wrapping layer 14, the wrapping layer 14 has a smallest modulus of elasticity, which is about 15 GPa. Therefore, a modulus of elasticity of a material forming a high-elasticity layer needs to be lower than 15 GPa, to play good energy absorption and dispersion functions.

Figure 5:
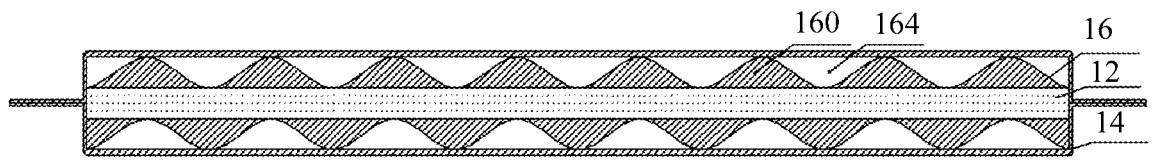
FIG. 5 is a sectional view of a flexible battery according to still another embodiment of the present invention.

As shown in FIG. 5, in some embodiments of the present invention, the modulus of elasticity of the filling part 162 is infinitely close to zero. In some embodiments, the filling part 162 may be an empty part 164 disposed between the plurality of supporting parts 160 and the wrapping layer 14. The empty part 164 is a region in which no solid object exists. The empty part 164 may be filled with atmospheric gas or ordinary air, or may be filled with some compressed high-pressure gas, to better play shaping and energy absorption functions for the energy absorbing layer 16. Except for the empty part, other characteristics of the flexible battery in this embodiment are the same as those in another embodiment described previously, and a shape of the empty part is consistent with that of the filling part 162.

The supporting part 160 and the empty part 164 are interlaced with each other. A surface, facing the empty part 164, of the supporting parts 160 is a wavy curved surface. On a cross section that is of the flexible battery 10 and that is vertical to the upper and lower surfaces of the electrochemical cell layer 12, a cross section of the supporting part 160 and a cross section of the empty part 164 are both in a shape of half-sine or half-cosine waveform.

Figure 6:
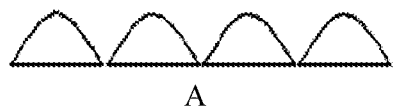
FIG. 6 is a schematic diagram of a shape of a cross section of a supporting part or a filling part according to some embodiments of the present invention.
Figure 6:
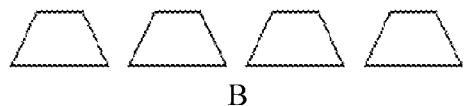
Figure 6:
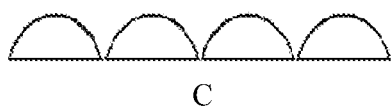
Figure 6:

As shown by A to D in FIG. 6, in some embodiments of the present invention, on a cross section that is of the flexible battery 10 and that is vertical to the upper and lower surfaces of the electrochemical cell layer 12, the supporting part 160 or the filling part 162 may be in a shape of any one of a semicircle, a semiellipse, an isosceles trapezoid, an isosceles triangle, and a hollow square. The shape of the cross section of the supporting part in the present invention is not limited to the foregoing listed shapes. It may be understood that, any design, based on an idea of the present invention, of a shape capable of implementing the energy absorption function of the energy absorbing layer of the flexible battery may be understood as a simple variation or extension of the present invention.

Referring to FIG. 1 as well, in some embodiments of the present invention, the flexible battery further includes a positive electrode and a negative electrode on a basis of the foregoing embodiments, a part of the positive and negative electrodes is inserted into the electrochemical cell layer 12, and the other part of the positive and negative electrodes stretches out of the electrochemical cell layer 12 and is wrapped in the wrapping layer 14. The positive and negative electrodes may be disposed at two ends of the flexible battery, or may be disposed on one side of the flexible battery or at one end of the flexible battery.

Figure 7A:
FIG. 7A and FIG. 7B are sectional views of a flexible battery according to some embodiments of the present invention.
Figure 7B:
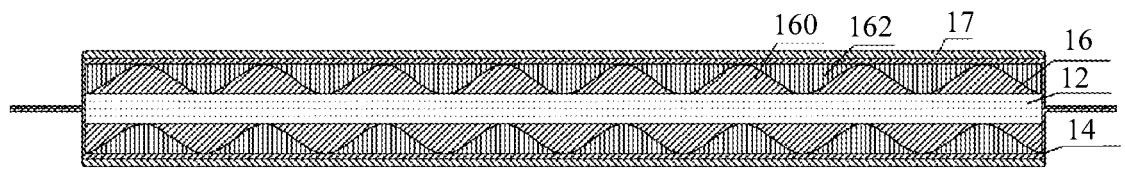

As shown in FIG. 7A and FIG. 7B, in some embodiments of the present invention, on a basis of the foregoing embodiments, the flexible battery further includes a protection layer that is disposed on an outer surface of the wrapping layer 14 and that is made of an elastic material, to form, together with the energy absorbing layer 16, a double-layer energy absorbing layer 16 to protect the electrochemical cell layer 12. The elastic material forming the protection layer includes rubber, silicone gel, and a fiber material. As shown in FIG. 7A, the protection layer is configured to fill the wavy surface of the wrapping layer 14 as described in one of the foregoing embodiments, to further protect the flexible battery and enable the surface of the flexible battery to be flat, thereby adapting to some application scenarios in which a wearable-device accessory needs to have a flat surface. As shown in FIG. 7B, the protection layer is used to further add a layer of protection for the surface of the wrapping layer 14 as described in the foregoing another embodiment, to further cover the wrapping layer 14, so as to provide a nice appearance and enhance protection for the flexible battery.

Figure 8:
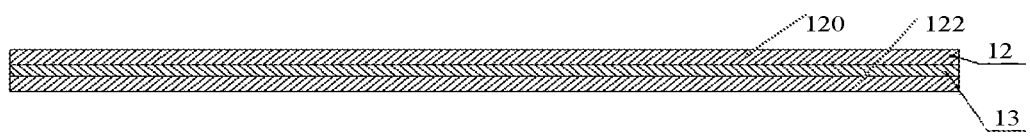
FIG. 8 is a schematic diagram of an electrochemical cell layer according to some embodiments of the present invention.

As shown in FIG. 8, in another embodiment of the present invention, a difference from the foregoing embodiments lies in that, the flexible battery not only includes the energy absorbing layer 16 disposed outside the electrochemical cell layer 12, but also has at least one auxiliary energy absorbing layer 13 disposed inside the electrochemical cell layer 12 in this embodiment of the present invention; and the electrochemical cell layer 12 includes at least two electrochemical cell sublayers 120 and 122, where the auxiliary energy absorbing layer 13 is disposed between every two of the electrothemical cell sublayers 120 and 122. The auxiliary energy absorbing layer 13 may include a plurality of supporting parts 160 that extend from one electrochemical cell sublayer 120 to another electrochemical cell sublayer 120. The auxiliary energy absorbing layer 13 is made of an elastic material. In some embodiments, the material for making the auxiliary energy absorbing layer 13 is the same as a material for making the supporting part 160 or the filling part 162 in the foregoing embodiments, or even the auxiliary energy absorbing layer in some embodiments is the same as the energy absorbing layer 16 in the foregoing embodiments.

Referring to FIG. 1 as well, still another embodiment of the present invention provides a wearable device, including a device body and a wearable-device accessory. The wearable-device accessory is configured to fasten the device body on a part of a human body, and the flexible battery 10 according to the foregoing embodiments is disposed inside the wearable-device accessory, to supply power to the device body. The flexible battery 10 may be directly used as the wearable-device accessory, or built in the wearable-device accessory of the wearable device. For example, the flexible battery 10 may be used as a watch strap of a smartwatch, or may be built into a watch strap of a smartwatch; or may be used as a fastening band of a VR device, or may be built into the fastening band. In this way, the flexible battery does not need to occupy any space of a main part of the wearable device, and can be used as a battery to supply electric power to the wearable device. It may be understood that, the flexible battery in this embodiment of the present invention is not limited to usage in the wearable device, and the flexible battery may be used in any electronic device that needs to be repeatedly bent. For example, a bendable or flexible terminal may be equipped with the flexible battery.

Figure 9:
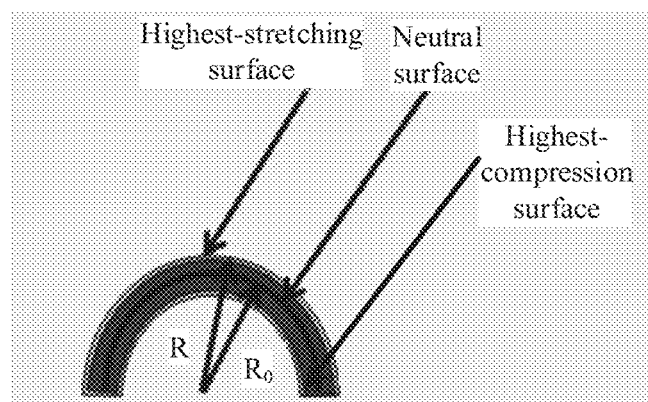
FIG. 9 is a schematic diagram of a mechanical model, which is applicable when a flexible battery is bent and deforms, according to an embodiment of the present invention.

For example, when the wearable device is worn on different parts of a human body, a radius of a wrist is the smallest and a bending radius $R_0$ is about 25 mm. Maximum strain generated varies according to different battery thicknesses. FIG. 9 shows a mechanical model applicable when the battery is bent and deforms, and corresponding maximum strain when batteries of different thicknesses are worn on an adult's hand. An outermost surface of a material bears highest stretching deformation, and an innermost surface bears highest compression deformation. It is assumed that a maximum thickness H of the battery is 5 mm, and maximum strain generated by the battery is 10%. Therefore, when an elastic limit of an elastic energy absorbing material is larger than 10%, the material is always in an elastic deformation region during repeated wearing, and deformation generated by the material is recoverable. The material has relatively good bending fatigue resistance. Due to existence of a high-elasticity energy absorbing layer, layers inside the battery can keep in close contact with each other under any circumstance, to avoid an increase in contact resistance, so that the battery has a stronger deformation capability and a higher electrochemical performance retention rate.

According to principles of engineering mechanics, a manner of calculating the maximum strain ε is as follows:

$$\varepsilon = (R\theta - R_0\theta)/R_0\theta$$
$$= (R - R0)/R0$$
$$= H/2R_0$$

where $R_0$ is a bending radius of a neutral surface during bending, R is a bending radius of a highest-stretching surface, and H is a material thickness.

In the foregoing embodiment of the present invention, a layer of materials, with a low modulus of elasticity, a high elastic limit, and a long fatigue life, is added inside or outside the flexible battery, to disperse and absorb stress generated when the battery is bent and deforms, to avoid partial excessive bending of the battery and enable the battery to maintain an arc for transition during bending, thereby achieving objectives of absorbing and dispersing the deformation stress.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A flexible battery, comprising an electrochemical cell layer and a wrapping layer that wraps the electrochemical cell layer, wherein the flexible battery further comprises an energy absorbing layer, wherein:
the electrochemical cell layer has a first surface and a second surface that are opposite to each other, wherein the electrochemical cell layer comprises two electrochemical cell sublayers and an auxiliary energy absorbing layer sandwiched between the two electrochemical cell sublayers;
the energy absorbing layer is located between the first surface of the electrochemical cell layer and the wrapping layer and between the second surface of the electrochemical cell layer and the wrapping layer;
the energy absorbing layer comprises a plurality of supporting parts and a plurality of filling parts, wherein a shape of the plurality of filling parts is complementary to a shape of the plurality of supporting parts, wherein a modulus of elasticity of the plurality of filling parts are lower than a modulus of elasticity of the plurality of supporting parts, wherein the plurality of filling parts are disposed between the plurality of supporting parts and the wrapping layer, wherein the plurality of supporting parts comprise a first contact surface that matches a second contact surface of the plurality of filling parts, wherein a shape of the first contact surface is complementary to a shape of the second contact surface, wherein each of the first contact surface and the second contact surface comprises a wavy curved surface, wherein the wavy curved surface is in a shape of a sine or cosine waveform, wherein the plurality of filling parts comprise a plurality of empty parts disposed between the plurality of supporting parts and the wrapping layer, and wherein compressed gas is filled inside the plurality of empty parts;
each supporting part in the plurality of supporting parts protrudes outward from either surface of the electrochemical cell layer; and
the plurality of supporting parts comprise an elastic material.

2. The flexible battery according to claim 1, wherein:
the energy absorbing layer comprises a first-surface supporting part and a second-surface supporting part;
the first-surface supporting part comprises a plurality of supporting parts located between the first surface of the electrochemical cell layer and the wrapping layer; and
the second-surface supporting part comprises a plurality of supporting parts located between the second surface of the electrochemical cell layer and the wrapping layer;
wherein a bulge of the first-surface supporting part protruding outward from the electrochemical cell layer is interlaced with a bulge of the second-surface supporting part protruding outward from the electrochemical cell layer, to facilitate bending of the flexible battery from either surface and avoid excessive bending.

3. The flexible battery according to claim 2, wherein a highest point, protruding outward from the electrochemical cell layer, of any supporting part in the first-surface supporting part corresponds, along a direction vertical to the first surface and the second surface, to a contact point between the second-surface supporting part and the surface of the electrochemical cell layer or a position closest to the surface of the electrochemical cell layer.

4. The flexible battery according to claim 1, wherein a wave crest of the wavy curved surface located on one surface of the electrochemical cell layer exactly faces, along a direction vertical to the first surface and the second surface of the electrochemical cell layer, a wave trough of the wavy curved surface located on the other surface of the electrochemical cell layer.

5. The flexible battery according to claim 1, wherein the plurality of filling parts and the plurality of supporting parts are interlaced with each other, wherein each one of the plurality of filling parts comprises an elastic material, and wherein a modulus of elasticity of each one of the plurality of filling parts is smaller than a modulus of elasticity of each one of the plurality of supporting parts.

6. The flexible battery according to claim 1, wherein on a cross section that is of the flexible battery and that is vertical to two opposite surfaces, which are the first surface and the second surface, of the electrochemical cell layer, a cross section of each one of the plurality of supporting parts and a cross section of each one of the plurality of filling parts are in a shape of half-sine or half-cosine waveform.

7. The flexible battery according to claim 1, further comprising a protection layer disposed on an outer surface of the wrapping layer, wherein the protection layer comprises an elastic material, to form double-layer protection for the electrochemical cell layer.

8. The flexible battery according to claim 1, further comprising a positive electrode and a negative electrode, wherein a part of the positive and negative electrodes is inserted into the electrochemical cell layer, and wherein the other part of the positive and negative electrodes extends out of the electrochemical cell layer and the wrapping layer, to supply electric power to a load.

9. The flexible battery according to claim 1, wherein the auxiliary energy absorbing layer comprises a plurality of supporting parts, and wherein each one of the plurality of supporting parts is in a shape of any one of a semicircle, a semiellipse, an isosceles trapezoid, an isosceles triangle, and a hollow square.

10. A wearable device, comprising a device body and a wearable-device accessory, wherein the wearable-device accessory is configured to fasten the device body on a part of a human body, wherein the wearable-device accessory comprises a flexible battery that supplies power to the device body, and wherein the flexible battery comprises:
   an electrochemical cell layer, wherein the electrochemical cell layer comprises two electrochemical cell sublayers and an auxiliary energy absorbing layer sandwiched between the two electrochemical cell sublayers;
   a wrapping layer that wraps the electrochemical cell layer; and
   an energy absorbing layer, wherein:
      the electrochemical cell layer has a first surface and a second surface that are opposite to each other;
      the energy absorbing layer is located between the first surface of the electrochemical cell layer and the wrapping layer and between the second surface of the electrochemical cell layer and the wrapping layer;
   the energy absorbing layer comprises a plurality of supporting parts and a plurality of filling parts, wherein a shape of the plurality of filling parts is complementary to a shape of the plurality of supporting parts, wherein a modulus of elasticity of the plurality of filling parts are lower than a modulus of elasticity of the plurality of supporting parts, wherein the plurality of filling parts are disposed between the plurality of supporting parts and the wrapping layer, wherein the plurality of supporting parts comprise a first contact surface that matches a second contact surface of the plurality of filling parts, wherein a shape of the first contact surface is complementary to a shape of the second contact surface, wherein each of the first contact surface and the second contact surface comprises a wavy curved surface, wherein the wavy curved surface is in a shape of a sine or cosine waveform, wherein the plurality of filling parts comprise a plurality of empty parts disposed between the plurality of supporting parts and the wrapping layer, and wherein compressed gas is filled inside the plurality of empty parts;
   each supporting part in the plurality of supporting parts protrudes outward from either surface of the electrochemical cell layer; and
   the plurality of supporting parts comprise an elastic material.

* * * * *